C. M. DAVIS.
RACK.
APPLICATION FILED MAR. 17, 1914.
1,123,109. Patented Dec. 29, 1914.
Fig. 1.
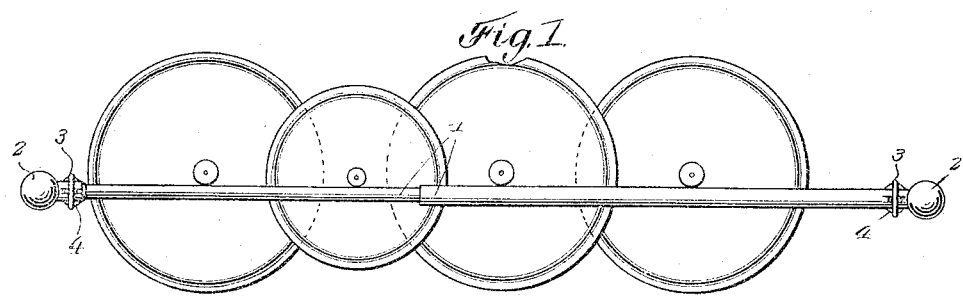
Fig. 2.
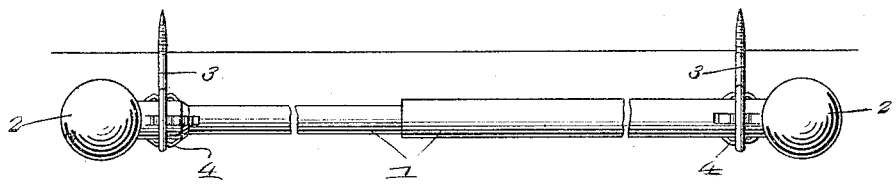
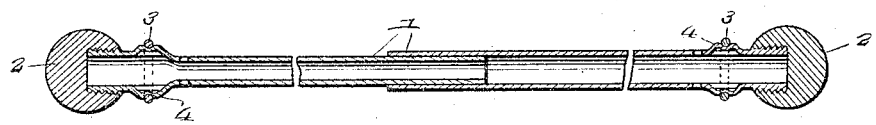
Fig. 3.
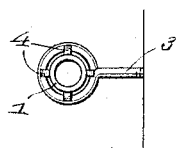
Fig. 4.
Inventor
C. M. Davis,
Witnesses
J. H. Crawford
O. Edmonston Jr.
By Victor J. Evans
Attorney

UNITED STATES PATENT OFFICE.

CALLIE M. DAVIS, OF LOS ANGELES, CALIFORNIA.

RACK.

1,123,109. Specification of Letters Patent. Patented Dec. 29, 1914.

Application filed March 17, 1914. Serial No. 825,343.

*To all whom it may concern:*

Be it known that I, CALLIE M. DAVIS, a citizen of the United States, residing at Los Angeles, in the county of Los Angeles and State of California, have invented new and useful Improvements in Racks, of which the following is a specification.

This invention relates to racks and more particularly to pot lid supporting racks.

The principal object of the invention is to provide a simple and efficient device which may be cheaply constructed and which will be convenient for holding all types of pot lids in such position that they may be handily obtained and stored.

Further objects of the invention will appear as the following description is read in connection with the accompanying drawing, which forms a part of this application, and in which—

Figure 1 is a front elevation. Fig. 2 is a top plan view. Fig. 3 is a detail longitudinal sectional view. Fig. 4 is an end view with the knob removed.

Referring more particularly to the drawing, 1 represents a rod which is made of telescopically connected sections each being externally threaded at its outer end so as to receive an ornamenting cap or ball 2. This rod has the terminal ends of each section mounted in screw eyes 3 which are threaded into the wall or other supporting structure and space the rod away from the same so as to permit the pot lids to be inserted between the rod and the wall whereby they are limited in their downward movement by engagement of their knobs or handles with the rod.

In order to hold the lid in the screw eyes against movement I provide suitable means for engaging upon opposite sides of the screw eyes and preferably such means as will enable the rod to be inserted in the screw eye from either end. In the specific embodiment of this means as illustrated herein the telescoping section of the rod has its outer end enlarged to substantially the same diameter as the sheath section so that the screw eyes may have their eyes of the same diameter. The outer end of each section of the rod is provided with a plurality of pairs of oppositely extending tongues 4 which extend outwardly so as to present spring obstructions to the entrance of the section in the screw eyes whereby when the rod is inserted into the screw eye and the screw eye lies between the individual members of the pairs of tongues it will be held against movement in either direction.

As the balls or caps 2 are threaded into the ends of the sections or otherwise removably secured they may be disconnected from the section to which they are attached so as to permit the insertion of the section into the screw eye from either side, thus where the rack is mounted in a small alcove or adjacent side walls the rod may be conveniently placed in the screw eyes, as will be readily understood. The rod is, of course, made adjustable so as to be adapted to the space where the rack is to be placed.

What is claimed is:—

In a pot lid rack, the combination with a vertical support, mounting members carried by the support and having eyes, an adjustable rod including telescopic sections engaged at opposite ends in the eyes, spring tongues struck up from the rod and arranged to engage upon opposite sides of the eyes to prevent movement of the rod and caps removably carried by the rod.

In testimony whereof I affix my signature in presence of two witnesses.

CALLIE M. DAVIS.

Witnesses:
  D. P. KENDRICK,
  A. P. DAVIS.

Copies of this patent may be obtained for five cents each, by addressing the "Commissioner of Patents, Washington, D. C."